Feb. 5, 1957　　　H. A. DE CENZO　　　2,780,423
CONVERTIBLE AIRCRAFT WITH JET-DRIVEN ROTOR
Filed Dec. 17, 1952　　　　　　　　　　8 Sheets-Sheet 1
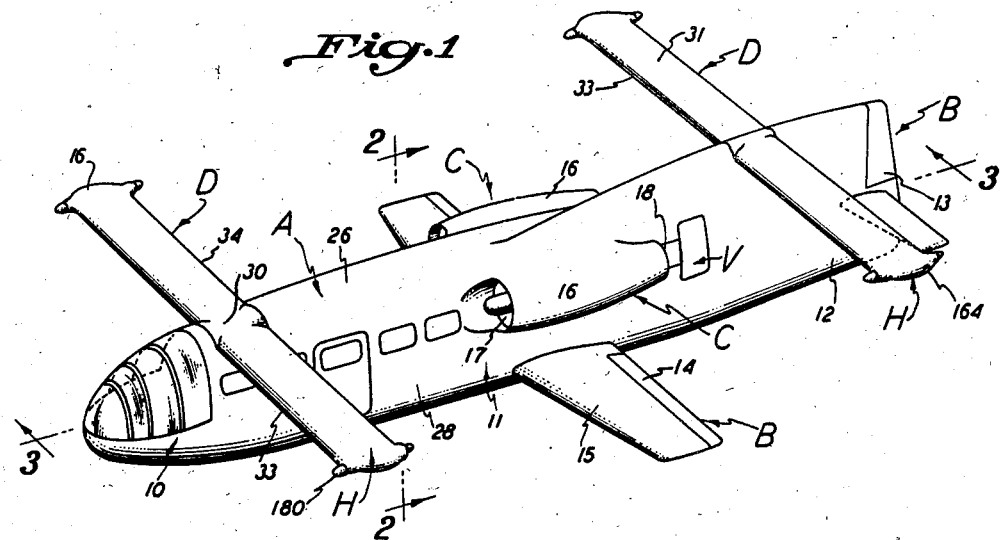
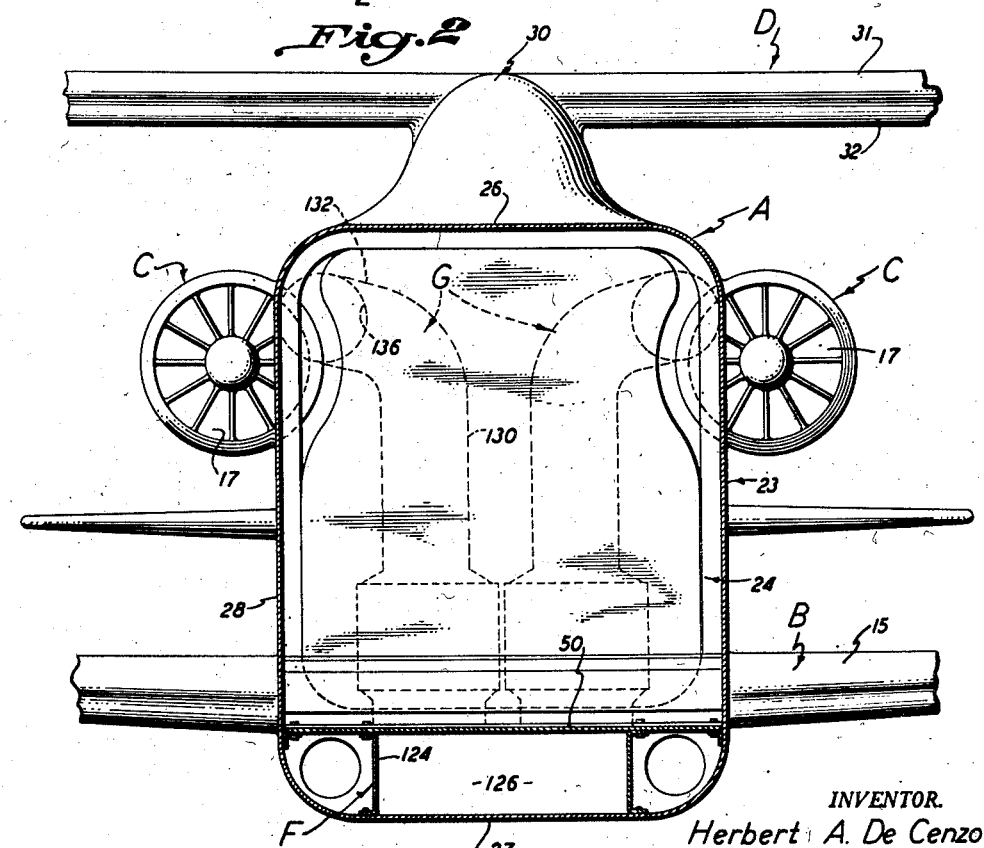
INVENTOR.
Herbert A. De Cenzo.
BY
Attorney.

Feb. 5, 1957 H. A. DE CENZO 2,780,423
CONVERTIBLE AIRCRAFT WITH JET-DRIVEN ROTOR
Filed Dec. 17, 1952 8 Sheets-Sheet 2
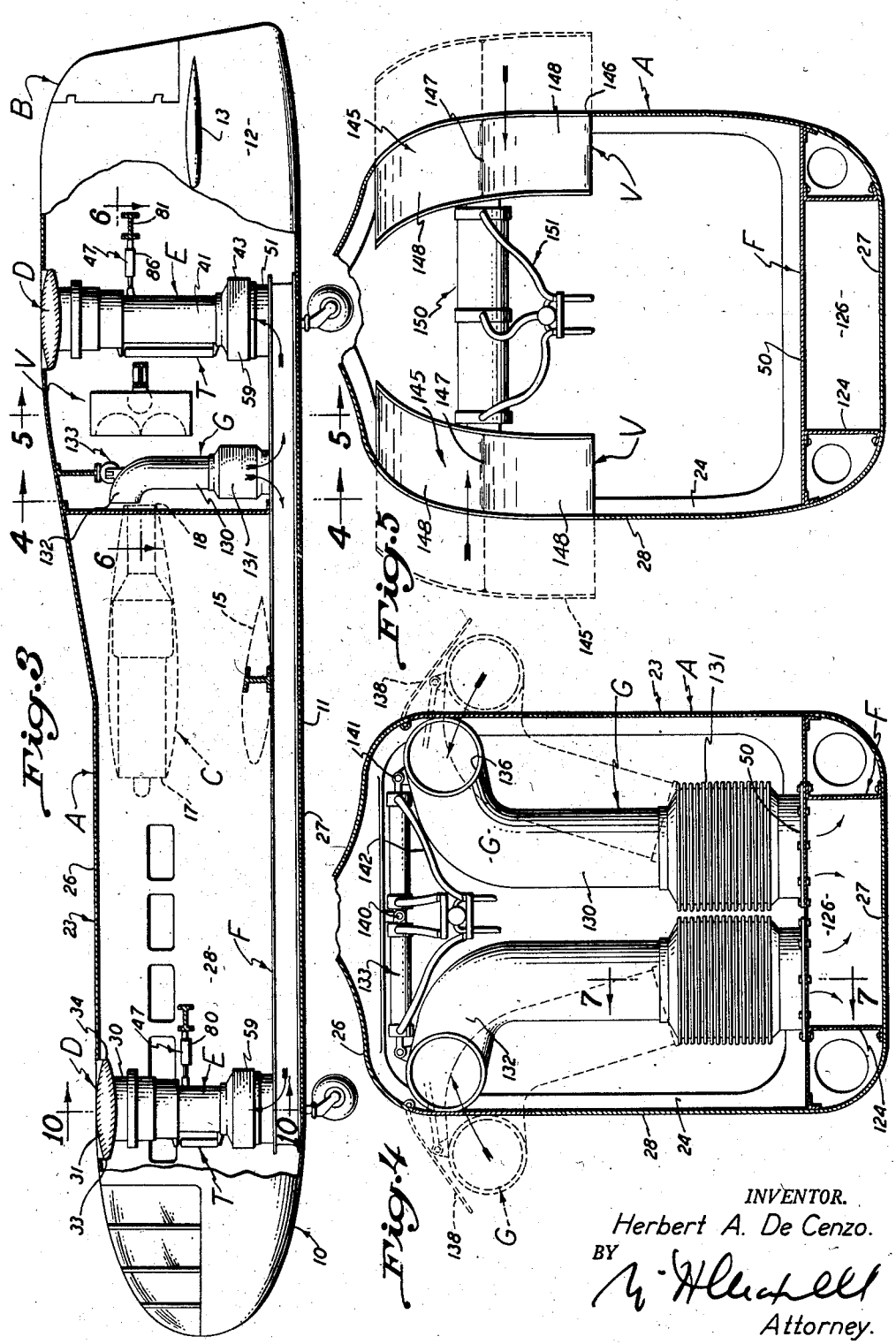
INVENTOR.
Herbert A. De Cenzo.
BY
Attorney.

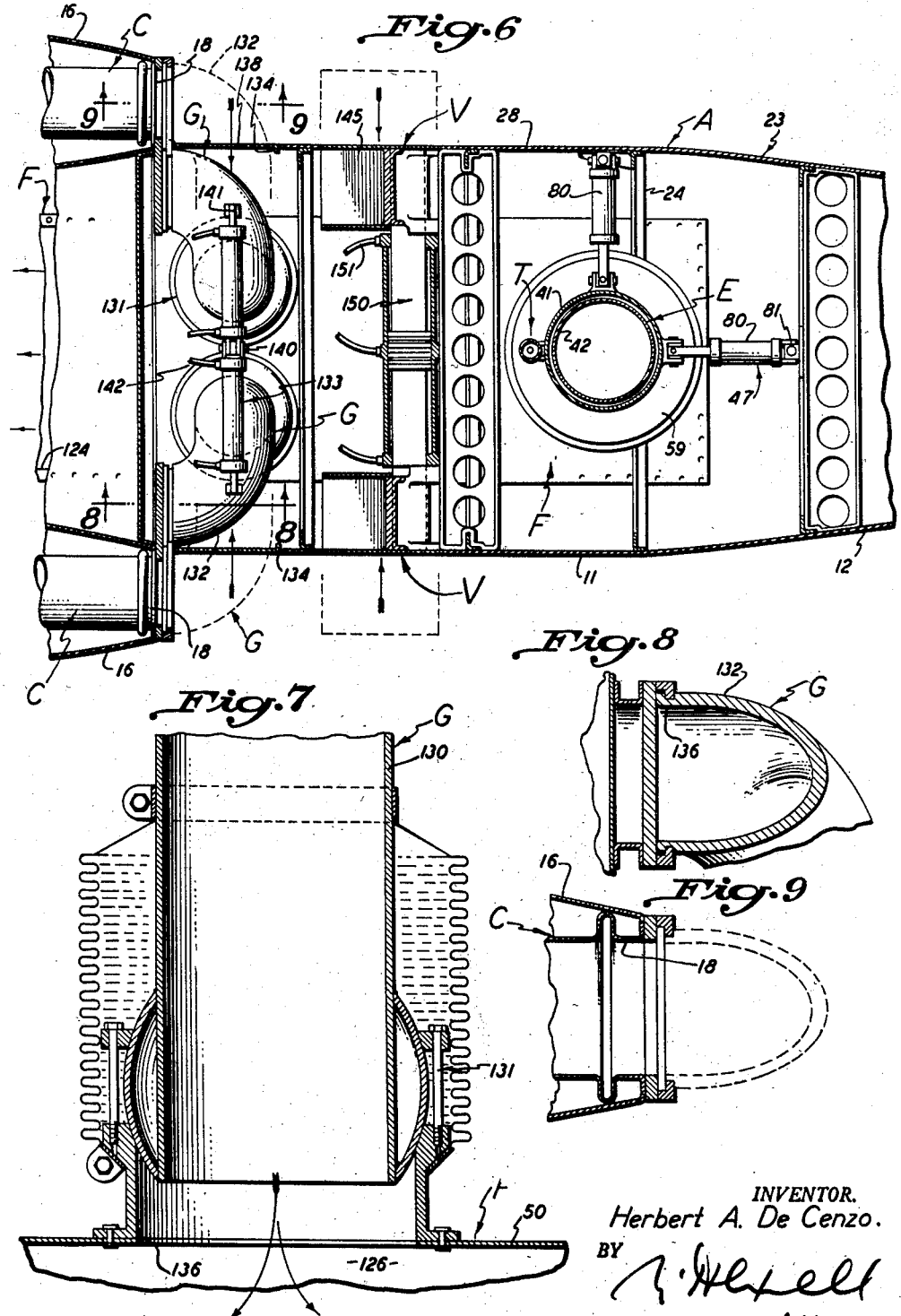

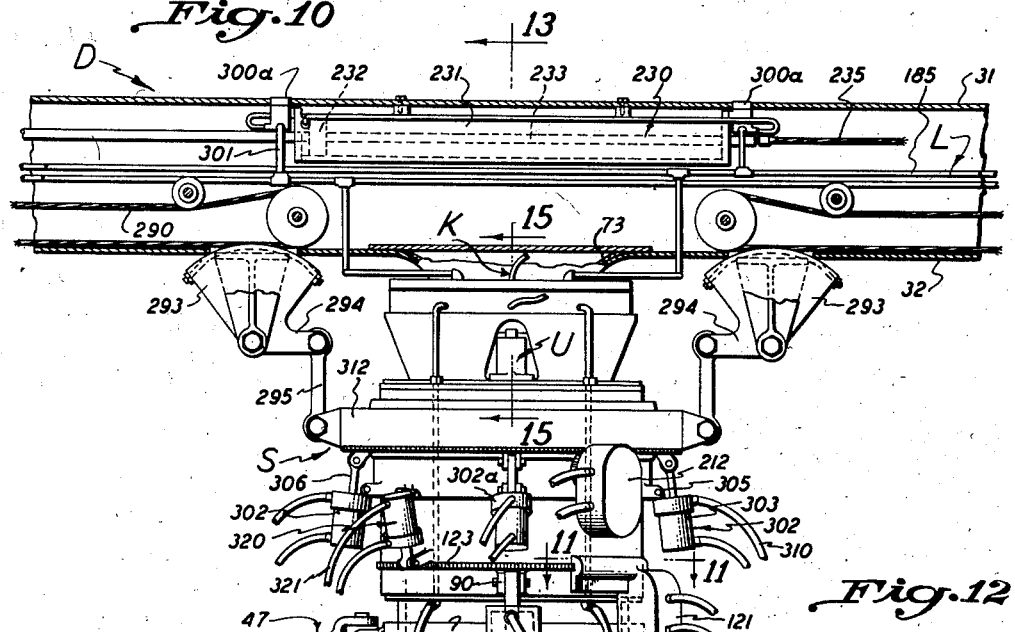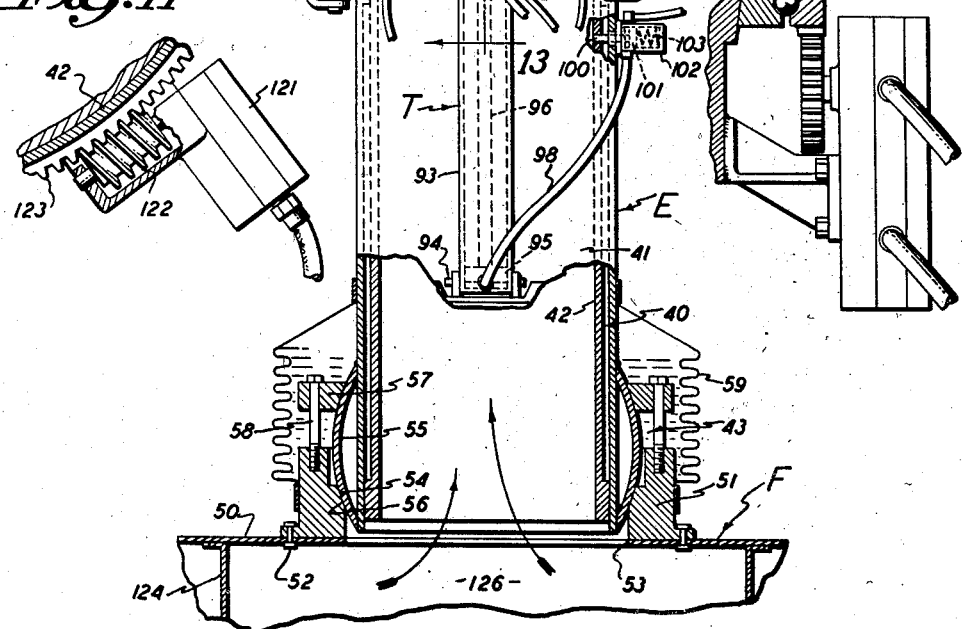

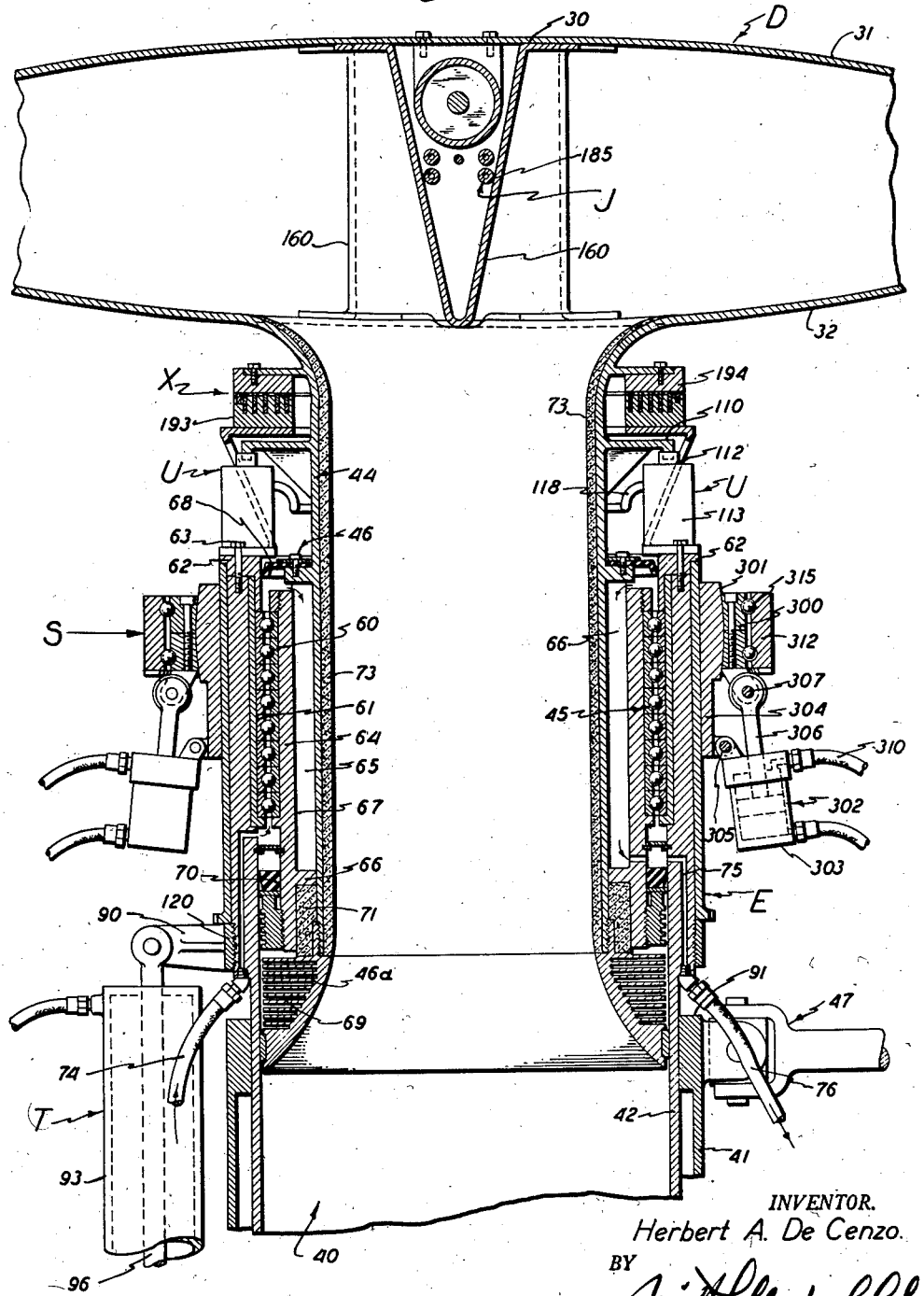

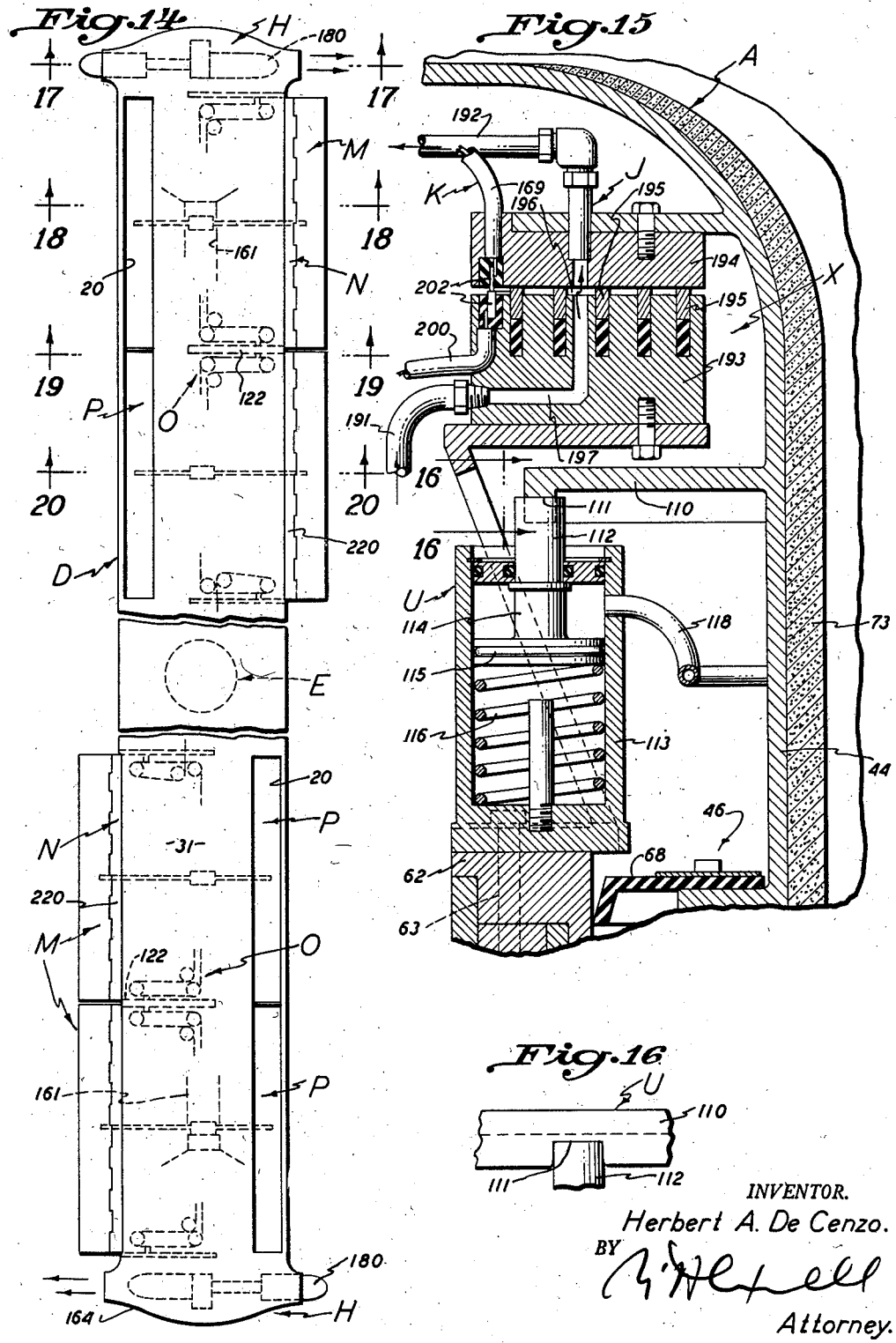
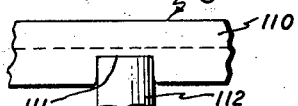

Feb. 5, 1957  H. A. DE CENZO  2,780,423
CONVERTIBLE AIRCRAFT WITH JET-DRIVEN ROTOR
Filed Dec. 17, 1952  8 Sheets-Sheet 7
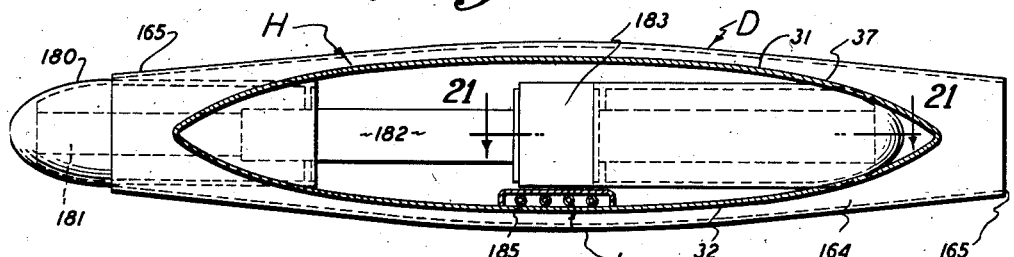
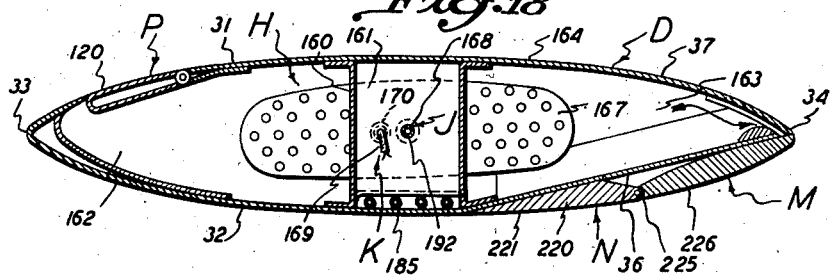
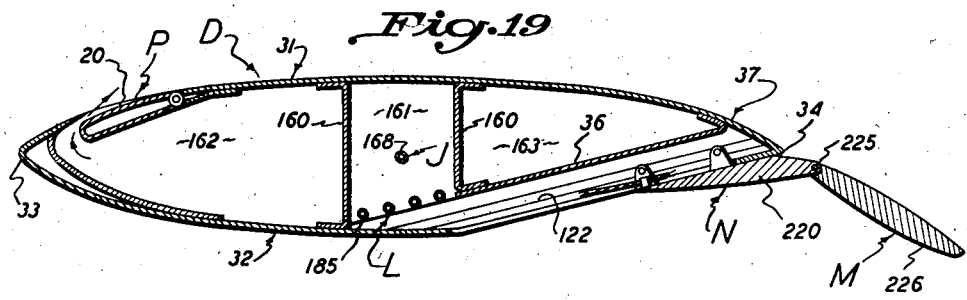
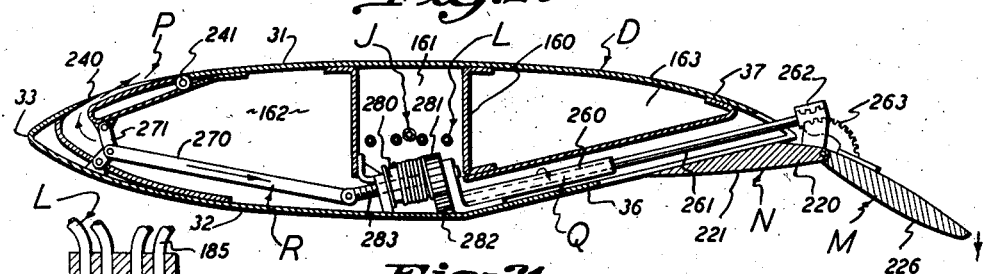
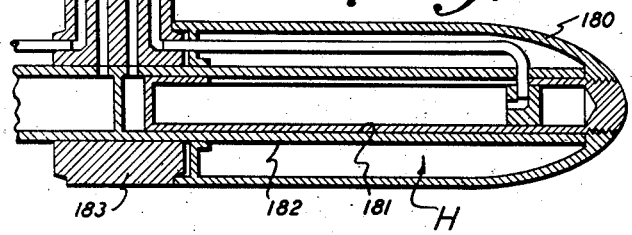
INVENTOR.
Herbert A. De Cenzo.
BY
Attorney.

Feb. 5, 1957 H. A. DE CENZO 2,780,423
CONVERTIBLE AIRCRAFT WITH JET-DRIVEN ROTOR
Filed Dec. 17, 1952 8 Sheets-Sheet 8
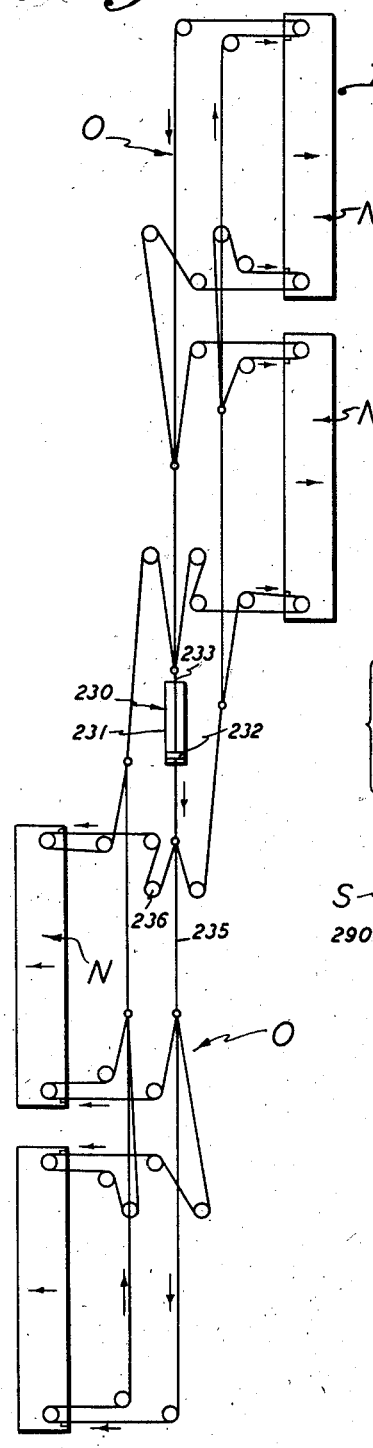
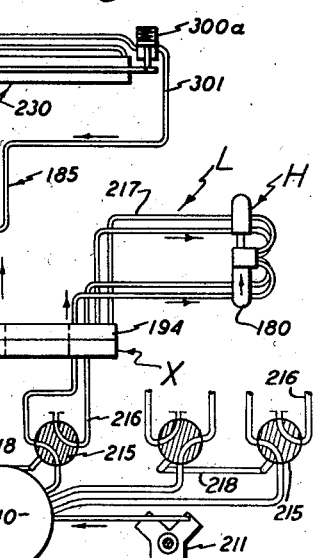
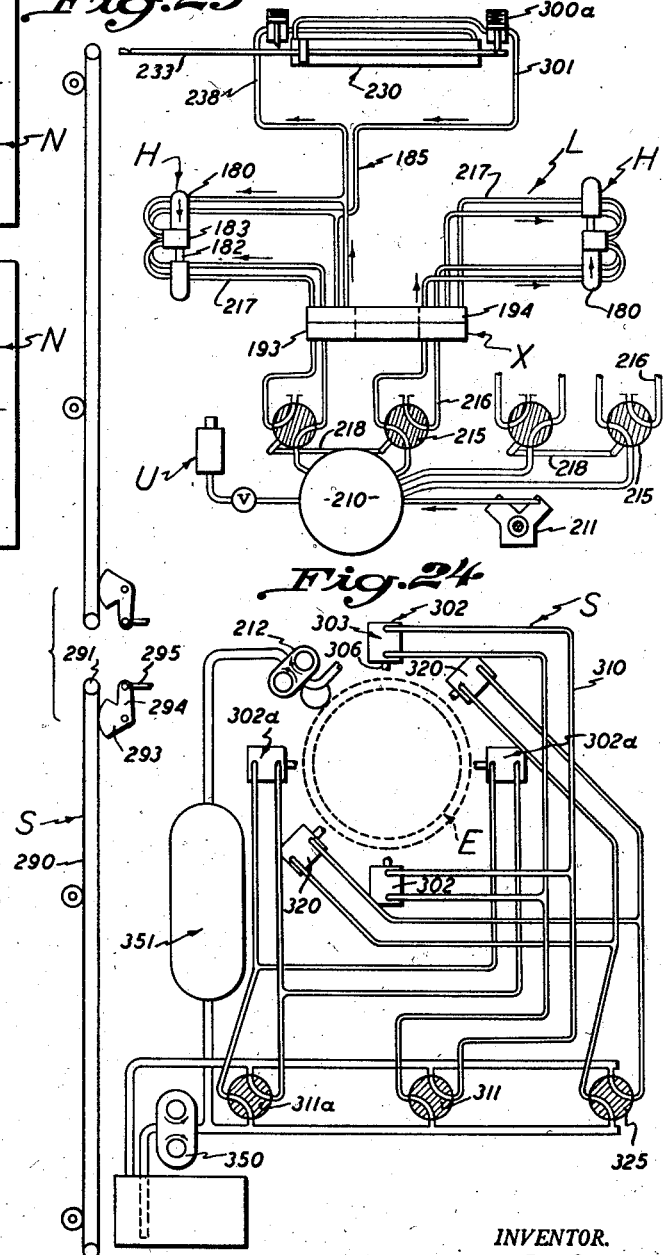
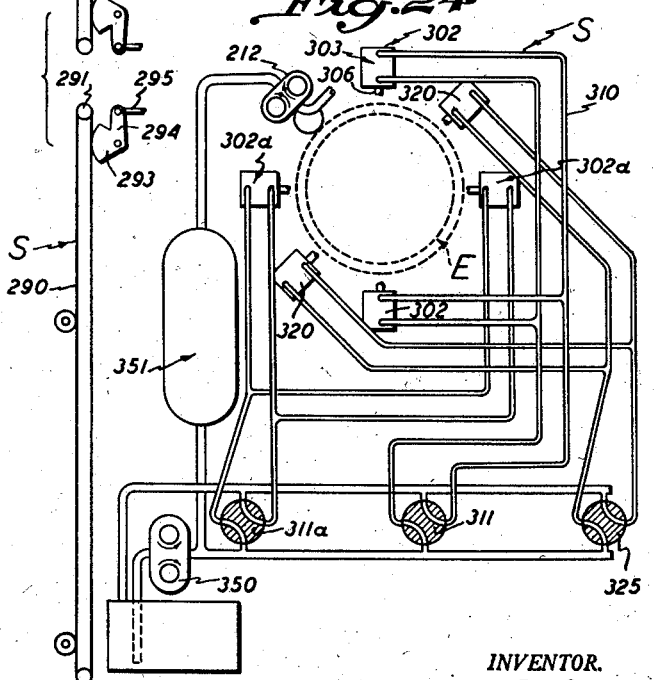
INVENTOR.
Herbert A. De Cenzo.
BY
Attorney.

United States Patent Office 2,780,423
Patented Feb. 5, 1957

2,780,423

CONVERTIBLE AIRCRAFT WITH JET-DRIVEN ROTOR

Herbert A. De Cenzo, Arcadia, Calif.

Application December 17, 1952, Serial No. 326,474

39 Claims. (Cl. 244—7)

This invention has to do with an aircraft, and it is a general object of the invention to provide a simple, practical, improved aircraft of the heavier than air type, and of the type that is convertible to act either in the nature of a helicopter or as a fixed wing plane.

It is recognized that aircraft of the type including one or more fixed planes or wings have certain desirable features and yet are limited by certain undesirable characteristics. It is likewise true that craft characterized by rotors and commonly referred to as helicopters have certain marked advantages and are attended by other undesirable characteristics. Proposals have been made in the nature of craft combining features of fixed wing planes and helicopters; however, for the most part, such constructions are complex, expensive and not altogether satisfactory or practical.

It is a general object of this invention to provide an aircraft convertible to act either as a fixed wing plane or as a helicopter, and possessed of such combination and arrangement and co-relation of essential elements as to form a highly effective and practical unitary structure.

It is another object of this invention to provide an aircraft of the general character referred to, characterized by one or more jet units serving when in action to propel the craft forward or horizontally, while at the same time delivering the gases that are utilized in the propulsion of one or more rotors employed primarily for vertical operation.

It is another object of this invention to provide an aircraft of the general character referred to, having a rotor, each blade of which is provided with a propelling unit, preferably at its outer end, the propelling units being characterized by plugs or closures which, when all in operation, streamline the rotor for satisfactory operation as a plane or wing, and which are selectively operable to establish the rotor in condition for effective dependable jet operation.

It is another object of this invention to provide an aircraft of the general character referred to including a simple, practical, improved means by which the elements of the propelling units of the rotor are dependably controlled from the body or fuselage of the craft.

It is a further object of this invention to provide an aircraft of the general character referred to, incorporating a simple, practical, improved rotor mounting by which the rotor is, when employed as a plane or blade, depressed and fixed relative to the fuselage of the craft and is, when in operation as a rotor, spaced a substantial distance of the fuselage and is effectively supported to rotate freely about a suitable axis.

It is a further object of this invention to provide an aircraft of the general character referred to, combining main or primary jet units at the fuselage of the craft for forward propulsion, and jet units on the rotors of the craft where after-burned gases from the main jet units, supplemented by the introduction of fuel, serve to propel the rotors.

It is a further object of this invention to provide an aircraft of the general character referred to, wherein the rotor is provided with flaps and operating means therefor by which the desired cyclic pitch of the rotor is gained and through which collective pitch of the rotor is also gained. With the construction provided by the present invention, the blades of the rotor as a whole need not be varied or pitched as is characteristic of the usual helicopter and which requires the exertion of substantial force, and the utilization of complicated mechanisms, but rather, flaps which are light, easily operated elements, are the only parts of the rotor requiring movement to gain both cyclic pitch and collective pitch.

It is a further object of this invention to provide an aircraft of the general character referred to wherein there is a general improved arrangement, combination, and relationship of parts providing a simple, practical, improved construction that is easy to control and which is dependable and effective in action.

The various objects and features of my invention will be fully understood from the following detailed description of a typical preferred form and application of my invention, throughout which description reference is made to the accompanying drawings, in which:

Fig. 1 is a perspective view of a craft embodying the present invention, the particular craft illustrated being characterized by two rotors spaced longitudinally of the craft, and these rotors in this figure are illustrated in fixed position to serve as planes or wings of the craft.

Fig. 2 is an enlarged detailed transverse sectional view of a portion of the craft as shown in Fig. 1, being a view taken substantially as indicated by line 2—2 on Fig. 1. Fig. 3 is a longitudinal view of the craft showing a substantial portion of the fuselage thereof in section to illustrate the general arrangement and relationship of essential elements.

Fig. 4 is an enlarged detailed transverse sectional view taken substantially as indicated by line 4—4 on Fig. 3. Fig. 5 is an enlarged detailed transverse sectional view taken substantially as indicated by line 5—5 on Fig. 3. Fig. 6 is an enlarged detailed plan section of a portion of the structure, being a view taken substantially as indicated by line 6—6 on Fig. 3. Fig. 7 is an enlarged detailed vertical sectional view of a portion of the structure shown in Fig. 4, being a view taken as indicated by line 7—7 on Fig. 4.

Fig. 8 is an enlarged detailed sectional view of a portion of the structure shown in Fig. 6, being a view taken as indicated by line 8—8 on Fig. 6. Fig. 9 is an enlarged detailed sectional view of a portion of the structure shown in Fig. 6, being a view taken as indicated by line 9—9 on Fig. 6.

In Figs. 6 and 9, the parts are shown in full lines in one position and are indicated by dotted lines in another position.

Fig. 10 is an enlarged vertical detailed view of a portion of the structure as shown in Fig. 3, being a view illustrating in detail the structure provided to mount a rotor from the fuselage of the craft, certain parts being broken away to show in section.

Fig. 11 is an enlarged detailed sectional view of a portion of the structure shown in Fig. 10, being a view taken as indicated by line 11—11 on Fig. 10. Fig. 12 is an enlarged detailed sectional view of a portion of the structure illustrated in Fig. 10, showing a detail of a pressure generator or pump operated by the rotor. Fig. 13 is an enlarged detailed sectional view of a portion of the structure, being an enlarged detailed section taken substantially as indicated by the line 13—13 on Fig. 10.

Fig. 14 is a plan elevation of a rotor as provided by the present invention. Fig. 15 is an enlarged detailed sectional view of a portion of the structure shown in Fig. 10, being a view taken as indicated by line 15—15 on Fig. 10. Fig. 16 is a detailed view of a portion of the structure shown in Fig. 15, being a view taken as indicated by line 16—16 on Fig. 15.

Figs. 17, 18, 19 and 20 are enlarged detailed transverse sectional views of the rotor as shown in Fig. 14, being views taken as shown by lines 17—17, 18—18, 19—19 and 20—20 respectively on Fig. 14.

Fig. 21 is an enlarged detailed plan section of a part of the structure shown in Fig. 17, being a view taken substantially as indicated by line 21—21 on Fig. 17. Fig. 22 is a diagrammatic view illustrating the means provided for the shifting of the flaps between retracted positions where they are, in effect, plane or wing forming parts of the rotor, and a working or projecting position where they are supplemental to the blades of the rotor to gain the pitching action desired.

Fig. 23 is a diagrammatic view illustrating a portion of the structure by which the flaps and dampers at the blades of the rotor are operated in synchronism.

Fig. 24 is a diagrammatic view illustrating a part of the structure by which structure as indicated in Figs. 21 and 23 is operable from the fuselage of the craft; and Fig. 25 is a diagrammatic view illustrating a pressure source and the operation of the shiftable elements of one of the rotor units from the fuselage of the craft.

The present invention contemplates various features of construction, various elements and relationships of parts, and numerous details which are applicable generally to aircraft of the general type under consideration. Since this is the case, the particular details set forth at this time and which will be hereinafter referred to are to be understood as merely typical embodiments of the invention, and it is to be recognized that as the invention is applied to varying situations it may be varied accordingly.

In the particular embodiment of the invention set forth in the drawings the structure includes generally a body or fuselage A which may, in practice, be an elongate substantially rigid shell-like unit with a nose portion 10, a belly or middle portion 11, and a tail portion 12. Control elements B are combined with or related to the fuselage A as circumstances may require, and, in the case illustrated, they include elements 13 at the tail portion 12 and elements 14 on limited wings 15 that project laterally from the sides of the middle portion 11 of the fuselage. It is to be understood that in practice, the controls may be varied in number and character, and that their actuation can be effected in any suitable manner.

The invention contemplates the provision of one or more rotors D in connection with the fuselage A, and in the particular case illustrated, there are two rotors D which are substantially alike, and these are located at the upper portion of the fuselage and are spaced apart longitudinally of the fuselage so that one adjoins the nose portion 10 while the other adjoins the tail portion 12. So far as the present invention is concerned, the essential features of construction and the equipment incidental to the rotors D may be alike, and therefore I will in the following description make reference to but one rotor, it being understood that such description is equally applicable to both.

The present invention provides one or more jet units C on or in connection with the fuselage A, and these are preferably direct-acting units, for instance, they may be turbo jet units such as are commonly employed in aircraft of the so-called jet type. In the particular case as illustrated in Figs. 1 and 2, there are two jet units C and these are located at opposite sides of the fuselage and are carried by the middle portion 11 thereof. Each jet unit C as illustrated, has its essential working parts enclosed in an elongate projection or blister 16 on the exterior of the middle portion 11 of fuselage A. In Fig. 3 of the drawings conventional construction employed in a turbo jet unit is indicated in dotted lines, and in the drawings it is to be observed that at the forward ends of each unit C there is an air inlet 17, while at the rear end thereof there is a rearwardly faced or opening nozzle portion 18.

A mounting means E carries each rotor D from the fuselage A for rotation about a vertical axis and so that it is shiftable vertically relative to the fuselage. In accordance with the invention as best shown in Figs. 10 and 13, the mounting means E is a tubular structure adapted to handle a substantial flow of hot gases from the fuselage A to the rotor, the blades of which are constructed to serve as conductors of such gases. A duct F is provided in the fuselage A and serves to handle hot gases and to deliver them to the mounting means E for passage therethrough to the rotor. In a preferred embodiment of the invention, the duct F is preferably located in the lower or bottom part of the fuselage as shown in Figs. 3 to 5, and extends longitudinally thereof, and, where there is more than one rotor and corresponding mounting means E, it is preferred that there be a single duct F provided to supply hot gases thereto.

Gas receivers G are provided as shown in Figs. 3 and 4, it being preferred that there be at least one gas receiver G cooperatively related to each jet unit C. The gas receivers G are adapted to receive hot gases issuing from the jet units C and to deliver such gases to the duct F for flow therethrough to the means E. In the particular case illustrated, there is one gas receiver G for each jet unit C, and the receivers are alike.

Rotor propelling units H are provided on or in connection with the rotors D, preferably at the outer or tip end portions thereof, as shown in Figs. 14 and 17. In the particular case illustrated, there is one propelling unit in connection with each blade of the rotor, and the units H are at the outer extremities of the blades. The propelling units H are preferably of the jet type and are supplied with hot gases passed by the mounting means E and conducted through the blades of the rotor, the action of which hot gases may be supplemented by fuel supplied to the units H by means J, which receives fuel at the fuselage and delivers it to the units H.

A means K is provided to supply electric energy from the fuselage A to the units H as shown in Figs. 10 and 15, and a means L is provided to effect operation of the working parts of the units H from the fuselage, the action of means L being best illustrated in the diagram Figs. 10 and 25.

As illustrated in Figs. 18 to 20, each blade of the rotor is preferably provided with one or more flaps M, and means N mounts the flaps on the blades of the rotors for pivotal movement and for shifting bodily from retracted position where they fair into the airfoil contour of the blades and are flush with the blades and working positions, where they project from the blades.

An operating means O illustrated diagrammatically in Fig. 22 of the drawings is provided to actuate the means N and is preferably coordinated with the means O so that the bodily shifting of the blades made possible by means N is coordinated with the operation of the working parts of the means G and H.

The blades of the rotor are preferably provided at their upper forward portions with slots 20, see Fig. 19, and variable area slot controls P are provided and are preferably in the form of dampers. An operating means Q is provided in connection with each flap M to operate or pivot it, while an operating means R is provided in connection with each slot control or damper P.

A power means S is provided, as shown in Figs. 10, 13 and 24, to operate the means Q and R simultaneously and in synchronism and so that the coordinated flaps and dampers of one blade operate oppositely to these arrangements of the other blade of the rotor.

A power means T is provided, as best shown in Figs. 3 and 13, to operate the rotor vertically relative to the fuselage and a lock means U is provided to secure the rotor with the blades transverse of the fuselage when the rotor is down and employed as a wing or plane of the craft. The lock U shown in Fig. 10 is adapted to hold the rotor in either up or down position.

A means V, shown in Figs. 3, 5 and 6, is provided and utilizes gases from the jet units C to effect variable braking or checking of forward movement of the craft.

From the foregoing general statement of principal elements entering into the structure, there is a foundation established that will make apparent the significance of the details about to be described.

In the case of the fuselage A, it is contemplated that there may in practice be a wide variation in form and construction. For the purpose of the present invention, it may be considered that the fuselage is a shell-like unit or structure characterized by a skin 23 frame elements 24, and other features of construction such as are common to such a part of the usual aircraft. In the particular design illustrated, the fuselage is an elongate hollow shell with a top portion 26, bottom 27 and sides 28. It is to be understood that these parts as they approach and terminate at the nose portion 10 are suitably faired or related to provide a suitably round nose and likewise at the tail portion they are faired relative to each other and to the control parts that are incorporated in the structure.

The main jet units C as provided by the present invention are the elements provided for forward propulsion, and it is contemplated that in practice they may be varied widely in form and construction, and they may be located in various points on or relative to the fuselage as balance and sufficient propulsion may require. In the particular case illustrated, where there are two like turbo jets C, they are located at opposite sides of the middle portion 11 of the fuselage, and they extend longitudinally of the fuselage, so that their nozzles 18 open rearwardly and are disposed to deliver jets effective in propelling the craft in a forward direction.

The rotor construction as provided by the present invention may be varied widely and considerably. In the particular case illustrated, the rotor D is shown as a simple two-blade rotor, wherein the two like blades are diametrically opposite each other or project in opposite directions from a central portion or hub 30. The two blades of the rotor are preferably alike or identical, except that they are oppositely disposed, and it is to be understood that in practice they may be varied considerably as to size, shape and length. In the case illustrated, where the rotor is to be employed either as a wing or plane element of the craft or as a lift device, it is preferred that each blade be a hollow shell-like unit which is substantially rigid. In the case illustrated, the blade construction involves top and bottom walls 31 and 32 respectively, which have forward portions that converge and which join at a leading edge portion 33, while the rear edge portions converge and join at a trailing edge portion 34. In the particular design illustrated, the forward edge portions of the walls 31 and 32 that join at the leading edge 33 are similar generally in shape, whereas, in accordance with the present invention and to carry out the means N hereinafter described, the rear edge portion 36 of the bottom wall is recessed or such as to establish a cavity accommodating elements of the means N and the flaps M as will be hereinafter described, while the rear edge portion 37 of the top wall is of simple, rounded formation, as clearly shown in Figs. 18, 19 and 20 of the drawings.

The mounting means E provided by the present invention to carry the rotor D from the fuselage A is best illustrated in Figs. 10 and 13 of the drawings. In general, the means E includes a substantially vertical tubular column 40, sectional in form so that it has a lower section 41 and an upper section 42 telescopically related to the lower section, and shiftable vertically relative thereto. A means 43 mounts the column in the fuselage A for limited pivoting movement or shifting relative thereto, and where the column is sectional, the mounting means 43 carries the lower section 41 and serves to connect the lower end portion of section 41 to the fuselage. A tubular stem 44 is fixed to the hub portion 30 of the rotor and depends therefrom into the upper end of the upper section 42 of the column 40. A bearing means 45 rotatably supports the stem 44 in the column section 42. An upper sealing means 46 seals between the stem and column section 42, while a lower sealing means 46ª seals between the stem 44 and the column section 42. The mounting means 43 for the column 40 is such as to provide for or to allow limited pivotal shifting or movement of the column relative to the fuselage and therefore it is preferred to provide the means E with a stabilizing means 47.

In the preferred form of the invention, the telescopically related tubular sections 41 and 42 of the column 40 are of substantial size or diameter, and are wholly unretracted, so that they cooperate with the stem 44 to provide a gas-conducting structure of substantial capacity.

The mounting means 43 in the case illustrated, is shown as mounting the column 40 on the top plate 50 which is an element of the duct F as will be hereinafter described, the plate 50 being a fixed element in the fuselage A and located in the lower portion thereof, where it is but a short distance above the bottom 27 of the fuselage. The mounting means E includes a tubular or annular base 51 fixed to the plate 50 as by means of fasteners 52 to be in register with a port 53 provided in the plate 50. The base 51 is provided with a circumferentially curved seat 54. An enlargement 55 is provided on the lower end portions of the outer column section 41 and its exterior 56 is circumferentially curved and engages in the seat 54. A retainer in the form of a collar 57 engages around the enlargement 55 and a series of circumferentially spaced ties 58 connect the retainer 57 and the base 51 so that the retainer is held engaged with the enlargement 55 and holds it engaged with the seat 56. Since the structure just described is adapted to handle gases, it is preferred in practice to provide a gas-tight flexible jacket 59 around the elements just described, as clearly illustrated in Fig. 10 of the drawings.

The tubular stem 44 is fixed relative to the hub portion 30 of the rotor D and depends therefrom to extend a substantial distance downwardly of the upper end of the inner section 42 of column 40. The bearing means 45 is preferably an anti-friction bearing means, serving to rotatably support the stem 44 in the upper section 42 of the column. In the particular construction illustrated, the bearing means 45 includes an elongate series of anti-friction bearings 60 in a tubular holder 61 carried in the column section 42 and retained by a removable cap 62 held in place by releasable fasteners 63. A tubular sleeve 64 fits around the stem 44 to define an annular chamber 65 and it is supported on and is in effect made a part of the stem 44 by means of flanges 66 projecting inward from the sleeve and engaging the exterior of the stem. A series of bearings 60 is confined on the sleeve 64 between stop flanges 67. Through the construction just described, the stem is effectively supported in the upper section 42 of the column 40 to rotate freely relative thereto.

Suitable sealing means are provided above and below the bearing means 45, as shown in Fig. 13. The upper sealing means 46 illustrated includes a flexible sealing member 68 carried by the stem and engageable in the cap 62.

The sealing means 46ª beyond the lower end of the bearing includes a labyrinth seal at 69, a lip-type seal at 70, and a packing at 71.

In the preferred construction, a lining 73 of insulating material is provided in the stem 44 and extends lengthwise therein to shield the bearing means 45 from the heating of gases carried by the stem.

A lubricating and cooling means is provided for bearing means 45 and in the construction illustrated, a flexible oil supply line 74 is connected to the column section 42 to supply cool lubricant from a suitable source in the fuselage A to the lower end of the series of bearings 60. The lubricant, after passing upward through the series of bearings, flows around the upper end of the sleeve 64 to enter the annular chamber 65. A port 75 conducts the lubricant from the lower end of the chamber 65 to a flexible discharge duct 76.

The stabilizing means 47 as provided by the present invention and illustrated in Figs. 3 and 6, includes a plurality of shock absorbing units 80, anchored to suitable fixed supports 81 in the fuselage, and connected to the upper end portion of the outer section 41 of column 40. In practice, the shock absorbers 80 may be suitable hydraulic devices such as are commonly used in situations of this kind.

The stabilizing means 47 serves to normally hold the column vertically disposed, but not solidly or rigidly. The action of the shock absorbers 80 permits of, or allows for, certain limited movement of the column, relieving destructive strain from the craft.

The means T provided to operate the inner section 42 of the column relative to the outer section 41 is preferably a fluid pressure actuated means. As illustrated in Fig. 13, circumferentially spaced arms 90 project from the exterior of the column section 42 above the upper end 91 of the outer section 41. A cylinder and piston unit connects each arm with a fixed part of the fuselage or to the lower section 41 of the column. In the case illustrated, each of these fluid pressure actuated units or mechanisms includes a cylinder 93 anchored to the exterior of the lower column section by pin 94, while a piston 95 operates in the cylinder 93 and is connected to an arm 90 by a rod 96. Suitable flexible fluid-handling ducts 98 connect to the ends of cylinder 93 and connect to a suitable reservoir and may, in practice, be under control of a suitable valve.

As illustrated in Fig. 10, a spring-actuated latch 100 is carried by the lower section 41 of column 40 and when the upper section of the column is in its down or retracted position, the latch enters an opening in the upper section 42 and thus serves to retain the column collapsed. In the construction illustrated, the latch 100 is on a piston 101 in a cylinder 102, and a spring 103 normally yieldingly urges the latch to operating position. The cylinder 102 is connected in the pressure supply line 98 that connects to the lower end of cylinder 93, so that when pressure is supplied through said line 98 to cylinder 93 to move the column section 42 upwardly, that pressure acts on piston 101 to release the latch 100.

The lock means U, as shown in Figs. 15 and 16, is adapted to lock the stem 44 projecting from the rotor to the upper section of the column 40 so that no relative rotation occurs between these parts. The lock means U is a releasable device or mechanism and in the case illustrated it includes a flange 110 on the stem with a depending peripheral part having a notch 111 therein. A latch member 112 is mounted on the upper column section 42 to cooperate with the notched flange 110. In the case illustrated, the construction includes a cylinder 113 mounted on cap 62 to project upwardly therefrom. A stem 114 is carried by the cylinder and has a head 115 engaged by a compression spring 116 in the cylinder. The spring normally yieldingly urges the head upward. The latch 112 is on the upper end of the stem 114 and is therefore normally yieldingly held up. The head 115 is in the nature of a piston slidable in the cylinder 113, and the duct 118 to handle fluid under pressure connects to the upper end portion of cylinder 113. When fluid under pressure is introduced into the upper end of cylinder 113 as through a suitable control valve, the piston 115 is moved downwardly and the latch 112 is released from the notched flange.

It is to be understood that in practice the parts just referred to are located or related so that when the latch 112 is engaged in the notch 111 the rotor is in the desired position relative to the fuselage, say, for instance, such as is illustrated in Fig. 1 of the drawings.

It is also to be understood that other means can be employed to prevent the rotation of the inner cylinder of the mounting means E, as for instance, scissor structures, key and keyway structures, splines, and the like.

In accordance with the present invention, the means T serving to effect movement of the inner column section relative to the outer column section also serves as a means holding the column sections 41 and 42 against relative rotation. In the particular construction illustrated, the arms 90 of means T are not fixed directly onto the upper column section 42, but are on a collar 120, secured to the column section 42 by a screw thread. A fluid pressure actuated motor 121 is fixed to the collar 120 and is adapted to operate a worm 122 meshed with a gear 123 on the column section 42. Through this construction, the motor 121 can be energized to move the worm 120 one way or the other, and thus effect adjustment or trimming of the rotor into the desired rotative position relative to the fuselage.

The duct F provided by the invention to occur in the fuselage is, in the case illustrated in the drawings, established by the plate 50 hereinabove referred to, and spaced vertical partitions 124 which extend between the plate 50 and the bottom 27 of the fuselage A. In the construction illustrated, the plate 50 is in effect a floor or false bottom in the fuselage and the partitions 124 are parts which may serve not only to define the desired gas passage, but will also serve as structural elements of the ship.

In the case illustrated, the plate 50 extends longitudinally of the fuselage and since there are two rotors with their mounting means E, the plate 50 extends from one means E to the other. The partitions 124 are coextensive with the plate 50, and, as a result, there is a longitudinal flow passage 126 established in the fuselage at the bottom thereof as clearly shown throughout the drawings. As shown in Fig. 4, each gas receiver G is cooperatively related with or to a jet unit C, and in the case illustrated, it includes a tubular neck 130, mounting means 131 mounting the neck in communication with the duct 126, a head 132 on the neck of the upper end thereof, and provided with a forwardly opening inlet port 136. A means 133 is provided for operating the neck to move it from a position within the fuselage to a position where it projects through an opening 134 in the fuselage so that the head 132 with the inlet port 136 is in the path of gases issuing from the jet unit C.

In the case illustrated, the neck 130 is a simple straight tubular part of substantial size or capacity and when it is in the normal or retracted position, as shown in Fig. 4, it is substantially vertical.

The mounting means 131 connects the lower end portion of neck 130 to the plate 50 so the neck is in communication with a port 137 in the plate 50. In practice, the mounting means 131 is such as to provide for the desired movement of the neck 130, as between the positions shown in full and dotted lines in Fig. 4 of the drawings, and in construction, the mounting means 131 may correspond to the means 43 hereinabove described, as will be observed from a comparison of Figs. 7 and 10 of the drawings.

The head 132 on the neck 130 at the upper end thereof is in the nature of a continuation of the neck projecting laterally therefrom, and first laterally of the fuselage and then forward, so that its terminal end faces forward and at this point the head has the open inlet port 136.

The opening 134 provided in the side 28 of the fuselage is such as to allow for shifting of the head between the positions shown in full and dotted lines in Fig. 4, and it may have a hinged closure 138 related thereto to close it when the head of the receiver is in the fuselage as shown in full lines in Fig. 4.

The operating means 133 is preferably a fluid pressure actuated means such, for example, as a cylinder and piston mechanism as shown in the drawings, and such mechanism may have one end anchored in the fuselage, while the other end is connected to the head 132 as at 141. Suitable flexible lines or ducts 142 may be connected to the cylinder and piston mechanism, so that operating fluid can be supplied thereto, so that when desired, the neck of the receiver is deflected from the vertical position to locate the head in the desired position relative to the jet unit C. It will be observed from the drawings that the head of the receiver can be located either in a fully out position where the port 136 is wide open, or it can be moved to positions where only a part of the port is available to receive gases from the unit C. It is to be observed that the present invention provides an arrangement of parts wherein the receiver G is located immediately rearward of the nozzle 18 of the jet unit C. As a result of this, a part or even all of the hot gases issuing from nozzle 18 may be taken by the receiver and any gases caught by the receiver G are passed thereby to the duct F to flow therefrom through the mounting means E, which passes them to the rotor D. It is also contemplated that the ducts 142 be of what is known in the trade as the expanding and diffusing type, so as to keep duct loss at a minimum.

In a construction such as is illustrated in Figs. 1 and 2 of the drawings, where there is a jet unit C at each side of the fuselage, there may be two receivers G arranged side by side as shown in Figs. 4 and 6 of the drawings, and suitable control valves incidental to the operating means 133 may be provided so that the receivers can be operated simultaneously or selectively as circumstances may require. The means V, as shown in Figs. 3 and 5, provided for checking or braking forward movement of the craft is preferably carried by the fuselage A to be located immediately behind the construction just described, it is, rearward of the gas receiver G. Where there is a jet unit at each side of the fuselage, it is preferred that there be two units of means V, one rearward of each jet unit. In the case illustrated, the means V includes a flow-directing baffle movable from a position within the fuselage as shown in full lines in Fig. 5 to a position projecting from the fuselage as shown in dotted lines in Fig. 5. The baffle preferably passes or operates through an opening 146 provided in the side wall 28 of the fuselage. In the form illustrated, the baffle includes a forwardly facing ridge element with an edge 147. Cup-shaped or concave flow-directing cup portions 148 adjoin or extend from the two sides of the ridge 147 and are such that a rearwardly flowing stream of gases hitting the baffle is divided and deflected to establish two forwardly directed streams of gases spaced a substantial distance apart. It is to be understood that more than two streams of gases could be established and if necessary directed away from the fuselage so that over-heating of the fuselage by the hot gases could, if necessary, be eliminated.

The means V includes suitable operating means 150 for the baffle 145 and in the case illustrated the means 150 is a fluid pressure actuated means or a cylinder and piston mechanism, and operating fluid under suitable control is supplied thereto by flexible ducts 151.

The present invention contemplates one or more rotor propelling units in connection with rotor D and in a typical application, there is one rotor propelling unit H in connection with or carried by each blade of the rotor. In a preferred arrangement shown in Fig. 14, each rotor propelling unit H is located at the outer or terminal end of the blade with which it is related, and the blade is formed or established to have one or more passages serving to conduct hot gases delivered to the rotor to the unit H.

In the construction illustrated in Figs. 13 and 18 to 20, the blade of the rotor is provided intermediate its leading and trailing edge portions 33 and 34 respectively with internal partitions 160 which extend longitudinally of the blade from the hub portion 30 of the rotor to the unit H carried by the blade. The partitions 160 are spaced apart and define a central longitudinal passage 161 in the blade, a forward longitudinal passage 162 in the blade, and a rear longitudinal passage 163 in the blade. In the preferred construction the hub portion of the rotor is so constructed as to exclude hot gases from the central passage 161, leaving this passage to handle control elements, ducts of various kinds, and auxiliary equipment as may be necessary. The passages 162 and 163 receive hot gases at the hub portion 30 and conduct them longitudinally of the blade.

It is to be understood that various blade constructions can be employed to insure proper control of heat in the blades as between the ducts, and might include insulated constructions, air-cooled construction or other like constructions.

The jet unit H at the outer or terminal end of the blade may in accordance with the broader principles of the present invention be varied widely in form, construction and number. In the particular case illustrated in Figs. 14 and 17, the unit H includes a tubular housing portion 164 elongate in form and extending transversely of the blade at the terminal end thereof, and defining nozzles 165 facing fore and aft at the tip of the blade. The housing 164 defines a combustion chamber open to the nozzles 165. A flame baffle 167 confines combustion to the combustion chamber which is in communication with the nozzles while a duct 192 of means J supplies fuel to the combustion chamber. An electric cable 169 extends to the chamber to there energize an igniter 170.

In the construction illustrated, plugs 180 are included in the means H, one for or related to each nozzle 165. The plugs are adapted to be operated so that they both simultaneously close the nozzles 165, or they can be operated to selectively close the nozzles so that one nozzle is open while the other is closed. In the construction illustrated, each plug 180 is carried by a ram 181 carried in a cylinder 182. The cylinder is carried by a central support 183 and the two cylinders for the two plugs project in opposite directions from the support 183, one forward, the other aft. Suitable flexible lines 185 carrying operating fluid are passed through the passage 161 to the support 183 where they are connected to the cylinders 182 so that through operation of valves suitably related to the lines 185 the rams can be operated in either direction to move the plugs 180 between retracted positions where they are clear of the nozzles 165 and to extended positions where they close the nozzles 165. When the plugs 180 are in the closed position they preferably have end portions projecting forward from and beyond the nozzles, which end portions are suitably rounded and serve to effectively stream-line the structure.

The means J, as shown in Fig. 15, provided for supplying the fuel to unit H or to the several units H carried by the rotor preferably includes a flexible fuel supply line 191 extending from a suitable source of supply in the fuselage, where the fuel may be under control of a valve, or the like. The fuel line 191 is connected to a fuel line 192 carried by the rotor through a coupling X. The particular coupling X is a slip-ring type device and includes a stationary ring 193 concentric with the stem 44 and spaced from ring 194. Sealing rings 195 of different diameter so that they are spaced apart seal between the rings 193 and 194 and define an annular chamber 196. A port 197 in the ring 193 conducts fuel from line 191 to the chamber 196, while a suitable port in the ring 194 conducts fuel from the chamber 196 to the fuel line 192.

The means K provided for supplying electric energy to the igniter 170 includes an ignition line 200 extending to a slip-ring and the line 169 extending from the slip-ring to the igniter 170. The slip-ring of means K is preferably combined as a unit with the coupling X of means J, and, as shown in Fig. 15 of the drawings, the rings 193 and 194 carry cooperating contacts 202 that serve to maintain electrical contact between the lines 200 and 169 as the rotor operates.

The means L is provided to effect operation of the working parts or plugs of the unit H from the fuselage A. It is believed that the means L will be best understood from a consideration of Fig. 25 of the drawings when this illustration is considered with Figs. 10 and 13 of the drawings. It is contemplated that operating fluid under pressure, preferably air, is available at a suitable accumulator 210 located in the fuselage A. The accumulator 210 may be supplied with air under pressure by means of a suitable power-driven pump 211 in the fuselage.

Where the rotor has two blades, each with a jet unit H, the means L preferably includes two reversible control valves 215 in suitable flexible fluid handling ducts 216 extending from the accumulator 210 to the coupling X where parts or elements of the coupling form a part of the means L. In the coupling X the rings 193 and 194 with cooperating sealing rings 195 provide fluid connections between the fluid handling ducts 216 in the fuselage, and fluid-handling ducts 217 in the rotor, which extend to the jet units H where the fluid serves to suitably operate the fluid pressure actuated means handling the plugs 180. It is preferred, in practice, that the valves 215 be connected or related as, for instance, by linkage 218, so that ordinarily the plugs are operated so that those at the leading edge or leading nozzle of each blade operate in like manner, while those at the trailing edge or trailing nozzle operate in like manner, and the valving is preferably such that it can be positioned so that the plugs are all simultaneously operated to be in the out or nozzle-closing position.

The flaps M as provided by the present invention are preferably located at or related to the trailing edge portions of the blades, and in the case illustrated in Figs. 14, and 18 to 20, the two flaps occur at the trailing edge portion of each blade. It is to be understood, however, that the number of flaps may be varied, and in carrying out the invention the several flaps are preferably alike.

The means N mounts each flap on a blade of the rotor for movement or shifting between a retracted or inoperative position where the flap is beneath the trailing edge portion of the blade and is adjacent thereto or flush therewith as shown in Fig. 18 of the drawings, and an operating position where it projects rearward of the blade and is free to be tilted or swung to various positions as will be apparent from Figs. 19 and 20 of the drawings.

In the case illustrated, the means N includes an element 220 which is in effect a part or section of the blade itself and is shiftable relative to the balance of the blade. In the construction illustrated, the element or section 220 extends longitudinally of the blade and is co-extensive of the flap M that it supports. The element 220 is slidably guided adjacent the flat lower trailing edge portion 36 of the blade to be shiftable between a forward position as shown in Fig. 18 where its exterior 221 forms a continuation of the exterior of the blade and a rear or actuated position as shown in Fig. 19 where it is at the extreme trailing edge portion of the blade. In practice, suitable guides 122, or the like, may be provided to support the element 220 for shifting between the positions just referred to. In the preferred construction the flap M carried by element 220 is joined thereto by a pivot pin 225, the axis of which is parallel with that of the blade, and the parts are arranged and related so that when the element 220 is retracted as shown in Fig. 18, the flap is forward or retracted and its surface 226 continues from the exterior surface 221 of element 220, and these parts form a continuation of the exterior of the blade, giving the blade an over-all desired cross-section as shown in Fig. 18. When the parts are positioned as shown in Fig. 19, the pivotal mounting of the flap M provides for operation or shifting of the flap to various positions as will be apparent from Figs. 19 and 20 of the drawings.

In accordance with the present invention, the means O provided to actuate the elements 220 between the positions above described, is preferably a fluid pressure actuated means employing air and in the case illustrated in Fig. 10, it preferably includes a single cylinder and piston unit 230 serving to operate the several elements 220 incorporated in the blade construction. In the particular case illustrated, and as will be best understood from Fig. 22 of the drawings, the cylinder 231 of the mechanism 230 is fixed, while the piston 232 is adapted to be operated in the cylinder and carries an operating rod 233 projecting from the ends of the cylinder. A system of flexible operating members or cables 235, shown in Fig. 22, connects to each end of the rod 233, one system being for one blade of the rotor and the other being for the other blade of the rotor. The flexible cables 235 are trained and guided over pulleys 236 or the like, and suitable pulleys are coupled or related to the elements 220 so that operation of the mechanism 230 between two extreme positions serves to operate the elements 220 between the retracted and extended positions above described.

In practice, it is preferred that fluid-handling lines or ducts 238 related to the fluid pressure actuated mechanism 230 be coupled with or related to ducts, for instance, lines 217 of means L, so that the means O is operated in synchronism with the means L to the end that, when the plugs of the jet units H are operated by means L so that the rearwardly facing nozzles are open, the elements 220 are operated to the extended position shown in Fig. 19, placing the flaps in position for operation, whereas, when means L is positioned to close all of the nozzles of the means H by means of the plugs, the elements 220 are moved to the retracted position as shown in Fig. 18. Thus, when the rotor is set or adjusted to act as a rotor for controlling vertical action of the craft, the jet units H and the flaps are set for operation, whereas, when the rotor is positioned relative to the fuselage so that it is stationary and serves as a wing or plane, the structure at the means H is closed and streamlined and the flaps are retracted, giving the blades as a whole the desired configuration for planing action.

It is preferred, in practice, that fluid pressure actuated lock units 300a be related to the rod 233 so that it is locked in its two extreme positions. Connectors such as lines 301 connect the locks in the fluid system so that, when pressure is applied to shift the rod, the lock holding it is released. This general arrangement will be understood from examination of Fig. 25 of the drawings.

In accordance with the preferred form of the invention, the blades of the rotor are provided in their upper forward or leading portions with slots 240 to provide construction for preventing or minimizing stalling such as is characteristic of helicopter operation. In the case illustrated, in Figs. 18 to 20, each blade is provided with longitudinal slots 240 and the control means P for the slots provided by elements in the form of dampers carried by pivotal mountings 241. When the rotor is to be used as a wing or planing element, the dampers are preferably closed as shown in Fig. 19, whereas, when the rotor is to be rotated, the dampers are preferably open, as shown in Figs. 19 and 20. It is to be observed that the construction is such that the slots 240 are open to or are adapted to be supplied with gases from the forward passage 162 in the blade. Further, it will be observed from the drawings, particularly from the arrows in Fig. 19, how gases from passage 162 are handled by the structure at the slots 240 to minimize stalling action.

The operating means Q, as shown in Fig. 20, provided by the present invention to effect tilting of the flaps M preferably includes a corresponding means or construction in connection with each flap, this in practice may include one or more units involving a drive shaft 260 carried by the blade for rotation, while an extension 261 of the shaft is telescopically related thereto and has keyed or splined engagement therewith to rotate with the shaft. A worm 262 on the shaft extension 261 meshes with a gear segment 263 on the flap. From Fig. 20 of the drawings, it will be apparent that as shaft 260 is rotated, the flap M is turned, deflected or adjusted, and the structure is such that the flap can be moved through a wide range of adjustment and will remain in any position to which it is adjusted by reasons of turning of shaft 260.

The means R provided for operating each damper P may include one or more units including a shiftable link 270 connected to a toggle mechanism 271 controlling operation of the damper. From Fig. 20 of the drawings, it will be apparent that as the link 270 is shifted lengthwise, the toggle 271 is operated to move the damper between the positions shown in Figs. 18 and 20.

The power means S provided by the present invention serves to operate the means Q and R in synchronism and is such as to result in the desired cyclic pitching or feathering of the flap or flaps in synchronism with the desired opening and closing of the dampers, to the end that the rotor as it turns has a highly desirable and efficient action.

In the case illustrated, it is preferred that there be a unit of means Q opposite or aligned with a unit of means R as shown in Fig. 20, and the power means S includes a rotating drum 280 related to each combination of units of means Q and R. The drum 280 is rotatably mounted in the blade of the rotor and carries a gear 281 meshed with a gear 282 on shaft 260, so that as the drum turns the shaft 260 is rotated. An operating screw 283 is threaded to the drum 280 and is pivotally connected to the link 270. As the drum 280 turns, the screw is moved lengthwise, causing shifting of the link 270 to operate the toggle mechanism 271.

The several drums 280 incorporated in a blade construction of the rotor are coupled by a common line 290, preferably a flexible cable which is wound around each of the drums and which is suitably guided as by means of pulleys 291. This general construction is best illustrated in Fig. 23 of the drawings. A suitable means is provided in each blade for operating the line 290 in the blade and in the case illustrated it is shown as a pivoted quadrant 293 to which the ends of the lines 290 are connected. The quadrant has a projecting arm 294 and an operating rod 295 connects to the arm 294.

It will be observed from Fig. 10 of the drawings that the quadrant 293 related to each blade is mounted at the under side of the blade adjacent the hub portion of the rotor, while the operating line or cable 290 extends through the blade in the chamber or passage 161. The means S includes structure by which the quadrants 293 are suitably oscillated, as the rotor turns, in order to gain the desired synchronous operation of the means Q and R operating the flaps M and dampers P. In the construction illustrated, a collar 300 is supported on a bearing 301 provided on the upper end portion of the upper column section 42. The bearing 301 has a spherical face carrying the collar 300 so that the collar can be tilted or locked on the bearing as by one or more operating units 302. In the case illustrated, several operating units 302, preferably hydraulically operated units, are circumferentially spaced about the structure and each has a cylinder 303 pivoted to a skirt 304 depending from bearing 301 by means of a pivot pin 305. A piston in cylinder 303 carries a rod 306 pivoted to the collar 300 by pivot pin 307. Fluid-handling lines 310 connect with the cylinder 303 and, in practice, are preferably under control of a valve 311, so that as the collar is moved or positioned up at one side of the structure, it is pulled down at the opposite side.

A sleeve 312 surrounds the collar 300 and is supported thereon by anti-friction bearing elements 315. The operating lines 290 are connected to the quadrants 293, the arms 294 of the quadrants connect to the sleeve 312. The rods 295 from the two quadrants arms 293, that is, from the opposite blades, connect to diametrically opposite sides of the sleeve 312. When the collar 300 and therefore the sleeve 312 is in a central or unactuated position as shown in Fig. 13, both quadrants 293 are in the same position, whereas, when the collar is moved up at one side and down at the other side, one quadrant 293 is operated in one direction from the position shown in Fig. 10, while the other is operated in the opposite direction from that position.

In a preferred carrying out of the invention a second pair of actuating units 302ª provided to tilt or rock the collar 300 on bearing 301 is included in the structure at right angles to the pair of units 302 and is under control of a valve 311ª. By providing two pairs of actuating units for rocking the collar 300, accurate tilting of the collar can be gained and it is possible to locate the collar in any desired tilted position about the pair.

In accordance with the construction provided by the invention, the bearing 301 surrounding the upper end portion of the upper column section 42 is slidable longitudinally on column section 42 to effect vertical shifting of the collar 300 and its sleeve 312, to the end that uniform general adjustment or shifting of the quadrants 293 can be effected. In the construction illustrated, a plurality of circumferentially spaced actuating units 320 connect and operate between the column section 42 and the bearing 301. In the case illustrated, each actuating unit 320 may correspond generally with each unit 302 and so connects the bearing 301 with the sleeve E as to hold the bearing against turning on the column section while at the same time being subject to operation to shift the bearing longitudinally or vertically on the sleeve E. It will be understood that suitable fluid pressure actuated mechanisms 320 supplied with operating fluid through lines 321 will effect the desired action. The flow of fluid to and from the units 320 may be under control of a suitable valve 325, so that an over-all or general adjustment of the flap and damper action of the rotor can be effected whenever desired.

In carrying out the present invention, the fluid pressure actuated system of means L is preferably separate from the fluid pressure actuated system of the means S, and is a pneumatic system as distinguished from the liquid system employed in means S.

Fluid, such as oil, under pressure may be employed in means S and in the drawings, a main pressure pump 350 is shown supplying a receiver 351 which supplies the necessary fluid under pressure in the lines of means S. In the case illustrated, a second pump 212 is driven as the rotor operates and supplies oil under pressure to the receiver 351. In the case of the pump 212 driven from the rotor, this pump may be mounted onto the upper section 42 of column 40 to be gear-driven by an element rotating with the rotor.

From the foregoing description it will be apparent that the present invention provides a construction wherein the main jet units C are serviceable to propel the craft forward when the rotors are fixed relative to the fuselage and serving as wings or planes. Further, as the rotors are being turned so that the craft acts as a helicopter, the main jet units C can be operated so that part of the gases therefrom propel the craft forward while the balance flows to the rotors for use at the jet units H thereof, or all of the gases from the units C can be passed to the rotors. When the rotors are employed as planes or wings the plugs of the units H close the nozzles of the units H and provide a satisfactory construction, and when the rotors are in operation in a normal manner, the plugs for the nozzles at the trailing edges of the blades are retracted and the hot gases fed to the units H issue to effect propelling of the rotors, and this action can be supplemented by fuel as desired.

It is to be understood that in carrying out the present invention, the various control devices, for instance, the valves, required, may in practice be located convenient to the operator of the craft, and it is to be understood that various conventional construction or devices and any necessary auxiliary equipment incidental to an airplane or a helicopter can be included in the structure as circumstances may require.

Having described only a typical preferred form and application of my invention, I do not wish to be limited or restricted to the specific details herein set forth, but wish to reserve to myself any variations or modifications that may appear to those skilled in the art and fall within the scope of the following claims:

Having described my invention, I claim:

1. An aircraft including, an elongate fuselage, a jet type propelling unit carried by the fuselage and adapted to deliver gases rearwardly of the fuselage, a rotor carried by the fuselage on an axis transverse thereof, and means adapted to receive gas delivered by the said unit and to deliver the received gas to the rotor including a gas receiver pivotally carried by the fuselage and means adapted to shift the receiver relative to the said unit into and out of position cooperatively related thereto.

2. An aircraft including, an elongate fuselage, a jet type propelling unit carried by the fuselage and adapted to deliver gases rearwardly of the fuselage, a rotor adapted to utilize gas, a tubular mounting carried by the fuselage and rotatably supporting the rotor on an axis transverse of the fuselage, and means adapted to receive gas delivered by the said unit and to deliver the received gas to the mounting means for passage therethrough to the rotor and including a gas receiver pivotally carried by the fuselage and means adapted to shift the receiver relative to the said unit into and out of position cooperatively related thereto.

3. An aircraft including, an elongate fuselage having a side opening, a jet type propelling unit carried by the fuselage and adapted to deliver gases rearwardly of the fuselage, a rotor carried by the fuselage on an axis transverse thereof, and means adapted to receive gas delivered by the said unit and to deliver the received gas to the rotor including a gas receiver carried by the fuselage and adapted to shift relative to the said unit into and out of position cooperatively related thereto, the receiver including an elongate tubular neck with a gas receiving head at one end thereof and means pivotally supporting the other end of the neck whereby the neck is shiftable to operate the head in said opening and relative to the said unit.

4. An aircraft including, an elongate fuselage having an opening and having a gas duct therein extending longitudinally thereof in the lower portion thereof, a rotor above the fuselage, means mounted in the fuselage and adapted to receive gas from said duct and rotatably supporting the rotor and adapted to deliver gas thereto, a jet type propelling unit carried by the fuselage and delivering gases rearwardly thereof, and a gas receiver carried by the fuselage rearward of the said unit, and adapted to receive the gases from the said unit and to deliver them to the duct, the receiver including, an elongate tubular neck, means pivotally connecting one end of the neck and the duct so the neck extends upwardly therefrom, a forwardly opening head on the other end of the neck, and means adapted to operate the head through said opening and into receiving engagement with said unit.

5. An aircraft including, an elongate fuselage, spaced jet type propelling units carried by the fuselage and adapted to exhaust gases rearwardly thereof, a rotor mounted on the fuselage on an axis transverse thereof, and means adapted to selectively receive the exhaust gases from said units and to deliver received gas to the rotor including, separate gas receivers pivotally carried by the fuselage, one cooperatively related to each jet unit and adapted to be varied relative thereto, and means adapted to shift the receivers to selectively operate them into and out of receiving engagement with the said units.

6. An aircraft including, an elongate fuselage with an opening, a jet type propelling unit on the fuselage adapted to exhaust gases rearwardly thereof, and means adapted to receive gas delivered by said unit including, a tubular gas receiver with a forwardly opening portion, and means mounting the receiver from the fuselage for operation through said opening to shift the said portion into receiving engagement with the rear of the said unit.

7. In combination a fuselage, a rotor above the fuselage, and means rotatably connecting the rotor and fuselage including, a substantially vertical tubular column having relatively movable upper and lower telescopically related sections, means pivotally connecting the lower end of the lower section to the fuselage, a tubular neck depending from the rotor and entered into the upper end of the upper section, and an anti-friction bearing rotatably supporting the neck in the upper section.

8. In combination a fuselage, a rotor above the fuselage, and means rotatably connecting the rotor and fuselage including, a substanially vertical tubular column having upper and lower telescopically related sections, means pivotally connecting the lower end of the lower section to the fuselage, a tubular neck depending from the rotor and entered into the upper end of the upper section, an anti-friction bearing rotatably supporting the neck in the upper section, and means adapted to shift the upper section of the column vertically relative to the lower section to operate the rotor vertically relative to the fuselage.

9. In combination, a fuselage, a rotor having an extensible flap adapted to move and vary the area thereof, a mounting connecting the fuselage and rotor for relative movement about a vertical axis, the mounting including a tubular column carried by the fuselage and having relatively movable upper and lower telescopically related sections, the lower section being secured to the fuselage and the upper section rotatably supporting the rotor, means whereby said flap is operated relative to the rotor including, an element tiltably carried by the upper section of the column, and a shiftable member cooperatively related to the flap and carried by the rotor in cooperative engagement with said elements, and means adapted to shift the upper section vertically relative to the lower section.

10. In combination, a fuselage, a slotted rotor having a damper adapted to control the slot and having an extensible variable flap, a mounting connecting the fuselage and rotor for relative movement about a vertical axis, the mounting including a tubular column carried by the fuselage and rotatably supporting the rotor, and a single means whereby the damper and flap are operated as the rotor turns relative to the column including, an element tiltably supported by the column, and a member cooperatively related to the damper and flap and operated by said element.

11. In combination, a fuselage, a slotted rotor having a damper adapted to control the slot and having an extensible variable flap, a mounting connecting the fuselage and rotor for relative movement about a vertical axis, the mounting including a tubular column carried by the fuselage and rotatably supporting the rotor, operating means adapted to actuate the damper, an operating means adapted to actuate the flap, and a single means adapted to synchronously actuate said operating means responsive to turning of the rotor relative to the column including, an element tiltably supported by the column, and a member cooperatively related to the damper and flap and operated by said element.

12. In combination, a fuselage, a slotted rotor having a damper adapted to control the slot and having an extensible variable flap, a mounting connecting the fuselage and rotor for relative movement about a vertical axis, the mounting including a tubular column carried by the fuselage and rotatably supporting the rotor, operating means adapted to actuate the damper, an operating means adapted to actuate the flap, and a single mens adapted to synchronously actuate said operating means responsive to turning of the rotor, including, an element tiltably supported by the column, and a member cooperatively related to the damper and flap and operated by said element.

13. In combination, a fuselage, a slotted rotor having a damper adapted to control the slot and having an extensible variable flap, a mounting connecting the fuselage and rotor for relative movement about a vertical axis, the mounting including a tubular column carried by the fuselage and rotatably supporting the rotor, and a single means whereby the damper and flap are operated as the rotor turns relative to the column, including, a bearing on the column, a collar tiltable on the bearing, a sleeve rotatably carried on the collar, and a shiftable member carried by the rotor cooperatively related to the said operating means and adapted to be actuated by the sleeve.

14. In combination, a fuselage, a slotted rotor having a damper adapted to control the slot and having an extensible variable flap, a mounting connecting the fuselage and rotor for relative movement about a vertical axis, the mounting including a tubular column carried by the fuselage and rotatably supporting the rotor, the column including telescopically related upper and lower sections, the lower section being carried by the fuselage and the upper section rotatably supporting the rotor, means adapted to shift the upper section vertically relative to the lower section, and a single means whereby the damper and flap are operated as the rotor turns relative to the column.

15. In combination, a fuselage, a slotted rotor having a damper adapted to control the slot and having an extensible variable flap, a mounting connecting the fuselage and rotor for relative movement about a vertical axis, the mounting including a tubular column carried by the fuselage and rotatably supporting the rotor, the column including telescopically related upper and lower sections, the lower section being carried by the fuselage and the upper section rotatably supporting the rotor, means adapted to shift the upper section vertically relative to the lower section, and a single means whereby the damper and flap are operated as the rotor turns relative to the column, including, an element tiltably supported by the upper section of the column, and a member cooperatively related to the damper and flap and operated by said element.

16. In combination, a fuselage, a slotted rotor having a damper adapted to control the slot and having a variable flap, a mounting connecting the fuselage and rotor for relative movement about a vertical axis, the mounting including a tubular column carried by the fuselage and rotatably supporting the rotor, the column including telescopically related upper and lower sections, the lower section being carried by the fuselage and the upper section rotatably supporting the rotor, means adapted to shift the upper section vertically relative to the lower section, and a single means whereby the damper and flap are operated as the rotor turns relative to the column, including, a bearing on the column, a collar tiltable on the bearing, a sleeve rotatably carried on the collar, and a shiftable member carried by the rotor cooperatively related to the said operating means and adapted to be actuated by the sleeve.

17. In combination, a fuselage, a slotted rotor having a damper adapted to control the slot and having a variable flap, a mounting connecting the fuselage and rotor for relative movement about a vertical axis, the mounting including a tubular column carried by the fuselage and rotatably supporting the rotor, the column including telescopically related upper and lower sections, the lower section being carried by the fuselage and the upper section rotatably supporting the rotor, means adapted to shift the upper section vertically relative to the lower section, and a single means whereby the damper and flap are operated as the rotor turns relative to the column, including, a bearing on the upper section and shiftable longitudinally thereof, means adapted to shift said bearing longitudinal of the upper section, a collar tiltable on said bearing, and a member carried by the rotor and cooperatively related to said operating means and adapted to be operated by said collar.

18. In combination, a fuselage, a rotor having a blade, a substantially vertical column rotatably mounting the rotor on the fuselage, a flap, an extensible mounting section shiftably carried by the blade and pivotally supporting the flap, means whereby the mounting section is adapted to be shifted and operable from the fuselage, and means whereby the flap is pivoted responsive to turning of the rotor.

19. In combination, a fuselage, a rotor having a blade, a substantially vertical column rotatably mounting the rotor on the fuselage, a flap, an extensible mounting section shiftably carried by the blade and pivotally supporting the flap, pneumatically actuated means whereby the mounting section is adapted to be shifted and operable from the fuselage, and mechanically actuated means whereby the flap is pivoted responsive to turning of the rotor.

20. In combination, a fuselage, a rotor having a slotted blade, a damper at the slotted portion of the blade, a substantially vertical column rotatably mounting the rotor on the fuselage, a flap, an extensible mounting section shiftably carried by the blade and pivotally supporting the flap, means whereby the mounting is adapted to be shifted and operable from the fuselage, and means whereby the flap and damper are synchronously operated relative to turning of the rotor.

21. In combination, a fuselage, a rotor having a slotted blade, a damper at the slotted portion of the blade, a substantially vertical column rotatably mounting the rotor on the fuselage, a flap, a mounting shiftably carried by the blade and pivotally supporting the flap, pneumatically actuated means whereby the mounting is adapted to be shifted and operable from the fuselage, and mechanically actuated means whereby the flap and damper are synchronously operated relative to turning of the rotor.

22. In combination, a fuselage, a rotor having a blade, a substantially vertical column rotatably mounting the rotor on the fuselage, a flap, an extensible mounting section shiftably carried by the blade and pivotally supporting the flap, means whereby the mounting section is adapted to be shifted and operable from the fuselage, and means whereby the flap is pivoted responsive to turning of the rotor, including means adapted to oscillate the flap and means operable to vary the degree of oscillation of the flap relative to the blade.

23. In combination, a fuselage, a rotor having a blade, a substantially vertical column rotatably mounting the rotor on the fuselage, a flap, a mounting shiftably carried by the blade and pivotally supporting the flap, means whereby the mounting is adapted to be shifted and operable from the fuselage, and means whereby the flap is pivoted responsive to turning of the rotor, the column being sectional and including a lower tubular section carried by the fuselage and an upper tubular section telescopically related to the lower section and rotatably carrying the rotor.

24. In combination, a fuselage, a rotor having a blade, a substantially vertical column rotatably mounting the rotor on the fuselage, a flap, a mounting shiftably carried by the blade and pivotally supporting the flap, means whereby the mounting is adapted to be shifted and operable from the fuselage, and means whereby the flap is pivoted responsive to turning of the rotor, the column including a lower tubular section carried by the fuselage, an upper tubular section telescopically engaged with the lower section and rotatably carrying the rotor, and means adapted to operate the upper section vertically relative to the lower section.

25. In combination, a fuselage, a rotor having blades, a mounting carried by the fuselage rotatably carrying the rotor, jet propulsion nozzle units carried at the tips of the blades and including shiftable control elements, flaps carried by the blades and adapted to shift relative thereto, and means adapted to synchronously operate the control elements and flaps from the fuselage including a single fluid pressure actuated mechanism operating the several flaps and individual fluid pressure actuated mechanisms operating the control elements.

26. In combination, a fuselage, a rotor having blades, an extensible mounting section carried by the fuselage rotatably carrying the rotor, jet propulsion nozzle units carried by the tips of the blades and including shiftable control elements, flaps carried by the blades and adapted to shift relative thereto, and means adapted to synchronously operate the control elements and flaps from the fuselage including, a fluid handling slip-ring coupling at the mounting, a single fluid pressure actuated mechanism carried by the rotor and in communication with the coupling operating the several flaps, and individual fluid pressure actuated mechanisms at the propulsion units and in communication with the coupling and operating the control elements.

27. In combination, a rotor blade, a jet propulsion unit on the blade and including a shiftable control element, a flap, an extensible mounting pivotally carrying the flap and shiftably supported on the blade, means adapted to oscillate the flap as the rotor turns, and means adapted to synchronously operate the mounting and control element.

28. In combination, a slotted rotor blade, a slot damper, a jet propulsion unit on the blade and including a shiftable control element, a flap, an extensible mounting section pivotally carrying the flap and shiftably supported on the blade, means adapted to oscillate the flap, and actuate the damper, as the rotor turns, and means adapted to synchronously shift the mounting section and control element.

29. In combination, a slotted rotor blade, a slot damper, a jet propulsion unit on the blade and including a shiftable control element, a flap, an extensible mounting section pivotally carrying the flap and shiftably supported on the blade, mechanical means adapted to oscillate the flap and actuate the damper as the rotor turns, and fluid pressure actuated means adapted to synchronously shift the mounting section and control element.

30. In combination, a rotor blade, a jet propulsion unit on the blade and including a shiftable control element, a flap, an extensible mounting section pivotally carrying the flap and shiftably supported on the blade, mechanical means adapted to oscillate the flap as the rotor turns, means adapted to synchronously shift the mounting section and control element, and fluid pressure actuated means controlling the said mechanical means.

31. In combination, a fuselage, a rotor having a blade, a means rotatably connecting the rotor and fuselage, a jet propulsion unit on the blade and including a shiftable control element, a flap, an extensible mounting section pivotally carrying the flap and shiftably supported on the blade, mechanical means adapted to oscillate the flap as the rotor turns, means adapted to synchronously shift the mounting section and control element, and a fluid pressure actuated control for the said mechanical means carried by the means rotatably connecting the rotor and fuselage.

32. In combination, a fuselage, a rotor having a blade, a mounting carried by the fuselage and rotatably carrying the blade, a propulsion unit on the blade and having a shiftable control part, a flap, an extensible member pivotally carrying the flap and shiftable on the blade, means adapted to synchronously operate the said member and control part, and means responsive to turning of the rotor adapted to oscillate the flap.

33. In combination, a fuselage, a rotor having a slotted blade, a slot control damper carried by the blade, a mounting carried by the fuselage and rotatably carrying the blade, a propulsion unit on the blade and having a shiftable control part, a flap, a member pivotally carrying the flap and shiftable on the blade, means adapted to synchronously operate the said member and control part, and means responsive to turning of the rotor adapted to oscillate the flap and operate the damper.

34. In combination, a fuselage, a rotor having a blade, a mounting carried by the fuselage and rotatably carrying the blade, the mounting including a lower tubular section carried by the fuselage, an upper tubular section rotatably carrying the rotor and telescopically related to the lower section, and means adapted to shift the upper section relative to the lower section, a propulsion unit on the blade and having a shiftable control part, a flap, a member pivotally carrying the flap and shiftable on the blade, means adapted to synchronously operate the said member and control part, and means responsive to turning of the rotor adapted to oscillate the flap.

35. In combination, a fuselage, a jet unit carried by the fuselage, a rotor having a blade, a mounting carried by the fuselage and rotatably carrying the blade, a propulsion unit on the blade and having a shiftable control part, a flap, an extensible member pivotally carrying the flap and shiftable on the blade, means adapted to synchronously operate the said member and control part, means responsive to turning of the rotor adapted to oscillate the flap, and means adapted to receive gas from the jet unit and deliver it to the mounting for passage therethrough and to the rotor for utilization at this propulsion unit.

36. In combination, a fuselage, a jet unit carried by the fuselage, a rotor having a blade, a mounting carried by the fuselage and rotatably carrying the blade, the mounting including a lower tubular section carried by the fuselage, an upper tubular section rotatably carrying the rotor and telescopically related to the lower section, and means adapted to shift the upper section relative to the lower section, a propulsion unit on the blade and having a shiftable control part, a flap, a member pivotally carrying the flap and shiftable on the blade, means adapted to synchronously operate the said member and control part, means responsive to turning of the rotor adapted to oscillate the flap, and means adapted to receive gas from the jet unit and deliver it to the mounting for passage therethrough and to the rotor for utilization at the propulsion unit.

37. In combination, a fuselage, a jet unit carried by the fuselage, a rotor having a slotted blade, a slot control damper carried by the blade, a mounting carried by the fuselage and rotatably carrying the blade, a propulsion unit on the blade and having a shiftable control part, a flap, an extensible member pivotally carrying the flap and shiftable on the blade, means adapted to synchronously operate the said member and control part, means responsive to turning of the rotor adapted to oscillate the flap and operate the damper, and means adapted to receive gas from the jet unit and deliver it to the mounting for passage therethrough and to the rotor for utilization at the propulsion unit.

38. In combination, a fuselage, a rotor having a flap adapted to move relative thereto, a mounting connecting the fuselage and rotor for relative movement about a vertical axis, the mounting including a tubular column carried by the fuselage and having upper and lower telescopically related sections, the lower section being secured to the fuselage and the upper section rotatably supporting the rotor, means whereby said flap is operated relative to the rotor including, a bearing slidable along the upper section of the column, means adapted to operate the bearing along the said upper section, a collar tiltably carried by the bearing, and a member shiftably carried by the rotor and cooperatively related to the flap and adapted to be operated from the collar as the rotor turns.

39. In combination a fuselage, a rotor above the fuselage, means rotatably connecting the rotor and fuselage including, a substantially vertical tubular column having relatively movable upper and lower telescopically related sections, means pivotally connecting the lower end of the lower section to the fuselage, a tubular neck depending from the rotor and entered into the upper end of the upper section, an anti-friction bearing rotatably supporting the neck in the upper section, and means whereby a lubricant is circulated to cool and lubricate the bearing.

References Cited in the file of this patent

UNITED STATES PATENTS

| | | |
|---|---|---|
| D. 146,984 | Piasecki | June 24, 1947 |
| 2,086,085 | Lachmann | July 6, 1937 |
| 2,094,105 | Myers | Sept. 28, 1937 |
| 2,321,837 | Maxwell | June 15, 1943 |
| 2,322,715 | Kloeren | June 22, 1943 |
| 2,350,126 | Pitcairn | May 30, 1944 |
| 2,493,041 | Stalker | Jan. 3, 1950 |
| 2,493,042 | Stalker | Jan. 3, 1950 |
| 2,540,190 | Doblhoff | Feb. 6, 1951 |
| 2,544,497 | Herrick | Mar. 6, 1951 |
| 2,550,538 | Doman | Apr. 24, 1951 |
| 2,573,016 | Harby | Oct. 30, 1951 |
| 2,583,405 | Youngman | Jan. 22, 1952 |
| 2,601,104 | Douglas | June 17, 1952 |
| 2,606,622 | Bates | Aug. 12, 1952 |
| 2,642,143 | Miller | June 16, 1953 |
| 2,650,666 | Dorand | Sept. 1, 1953 |
| 2,674,421 | De Cenzo | Apr. 6, 1954 |

FOREIGN PATENTS

| | | |
|---|---|---|
| 578,710 | Great Britain | July 9, 1946 |
| 638,063 | Great Britain | May 31, 1950 |
| 1,002,007 | France | Oct. 31, 1951 |
| 482,607 | Germany | Sept. 17, 1929 |